United States Patent [19]

Laumain

[11] Patent Number: 4,595,712

[45] Date of Patent: Jun. 17, 1986

[54] STABLE PREPOLYMERS OF POLYISOCYANATE WITH HYDROXYL FUNCTIONS, A PROCESS FOR THEIR MANUFACTURE AND THEIR APPLICATION TO THE MANUFACTURE OF POLYURETHANES

[75] Inventor: Francois-Bernard Laumain, Levallois-Perret, France

[73] Assignee: Societe Chimique des Charbonnages, S.A., France

[21] Appl. No.: 693,109

[22] Filed: Jan. 22, 1985

[51] Int. Cl.$^4$ .................. C08G 18/14; C08G 18/32
[52] U.S. Cl. ............................ 521/167; 252/182; 528/78
[58] Field of Search ................. 521/167; 528/78

[56] References Cited

U.S. PATENT DOCUMENTS

| 3,049,515 | 8/1962 | Damusis | 528/78 |
| 3,072,582 | 1/1963 | Frost | 521/167 |
| 3,446,848 | 5/1969 | Aitken et al. | 528/78 |
| 3,763,111 | 10/1973 | Fijal | 521/167 |

Primary Examiner—Herbert S. Cockeram
Attorney, Agent, or Firm—Finnegan, Henderson, Farabow, Garrett & Dunner

[57] ABSTRACT

Stable polyisocyanate prepolymers containing hydroxy functions. The prepolymers are products of the polyaddition of at least one organic polyisocyanate with at least one condensation product (A) of an alkylene oxide with an amine, in the presence of at least one polyol (B) containing free hydroxy functions. The polyol (B) contains no primary hydroxy functions and has a molecular weight of at least 1,300.

The process for the manufacture of these prepolymers reacts, at a temperature between about 10° and about 150° C., the mixture of at least one organic polyisocyanate, at least one condensation product (A), and at least one polyol (B).

12 Claims, No Drawings

STABLE PREPOLYMERS OF POLYISOCYANATE WITH HYDROXYL FUNCTIONS, A PROCESS FOR THEIR MANUFACTURE AND THEIR APPLICATION TO THE MANUFACTURE OF POLYURETHANES

BACKGROUND OF THE INVENTION

The present invention relates to stable polyisocyanate prepolymers containing hydroxy functions, a process for their manufacture, and their application to the manufacture of polyurethanes, in particular, foams having high hardness.

The reaction of an organic polyisocyanate with a mixture of polyols, in which the polyol mixture includes a polyol free from tertiary nitrogen and 5 to 40% by weight of a polyol containing a tertiary nitrogen and in which the polyol mixture has from 2 to 8 hydroxy groups and a molecular weight of 175 to 1,000, is already known from U.S. Pat. No. 3,468,819. One of ordinary skill in the art, however, has found that the resulting products of this reaction have both inadequate stability and high viscosities that complicate their use in the manufacture of polyurethanes.

Accordingly, there is a need for the development of polyisocyanate prepolymers containing hydroxy groups that do not separate and are simple to make, stable, and of acceptable viscosities that can be lowered further by dilution in a third polyol because of the stability of the product.

SUMMARY OF THE INVENTION

Stable polyisocyanate prepolymers containing hydroxyl groups according to the present invention comprise products of polyaddition of at least one organic polyisocyanate with at least one condensation product (A) of an alkylene oxide with an amine, in the presence of at least one polyol (B) containing free hydroxy functions. The polyol (B) contains no primary hydroxy functions and has a molecular weight of at least 1,300.

The present inventive process results in a product superior to those obtained in previous processes. Specifically, the prepolymers of the present invention are stable and have acceptable viscosities that, because of the stability of the product, can be lowered even further.

These and other advantages of the present invention will be made more apparent from the following description of the preferred embodiments.

DETAILED DESCRIPTION OF THE PREFERRED EMBODIMENTS

The present invention provides stable polyisocyanate prepolymers comprising products of polyaddition of at least one organic polyisocyanate with at least one condensation product (A) of an alkylene oxide with an amine, in the presence of at least one polyol (B) containing free hydroxyl functions. The polyol (B) contains no primary hydroxy functions and has a molecular weight of at least 1,300.

The polyol (B) containing no primary hydroxy functions can be a polyether or a polythioether having a molecular weight of between about 1,300 and about 10,000. These polyethers or polythioethers can be obtained by the reaction of at least one alkylene oxide with at least one polyfunctional alcohol or thiodiglycol. Such polyethers or polythioethers contain preferably from 2 to 6 hydroxy functions per molecule and have preferably a viscosity less than or equal to 50 poises. The polyethers or the polythioethers are also preferably obtained from a mixture of alkylene oxides comprising at most 30% by weight of ethylene oxide.

The polyol (B) containing no primary hydroxy functions can also be a polyester of high molecular weight, such as a molecular weight greater than about 1,300. Such a polyol (B) is preferably obtained by reaction of a polycarboxylic acid with a polyfunctional alcohol. The polyol (B) can also be a grafted polyol that is obtained by first reacting a polyol with maleic anhydride and then reacting the reaction product with acrylonitrile, styrene, or both acrylonitrile and styrene.

The prepolymers of the present invention are preferably defined by the following four relationships:

(a)
$$\frac{nN}{a\alpha + b\beta}$$

of between about 0.01 and about 0.60;

(b)
$$\frac{n}{n + a + b}$$

of between about 0.025 and about 0.5;

(c)
$$\frac{b}{n + a + b}$$

of between about 0.20 and about 0.95 and, preferably, between about 0.2 and about 0.8; and (d)
$$\frac{a}{n + a + b}$$

of between about 0.025 and about 0.70 and, preferably, between about 0.10 and about 0.60.

In the relationships (a)–(d), n, N, a, b, $\alpha$, and $\beta$ are defined n is the number of polyisocyanate molecules;
N is the number of the NCO functions per molecule;
a is the number of molecules of the condensation products (A);
b is the number of polyol (B) molecules;
$\alpha$ is the number of mobile hydrogen functions per molecule of condensation product (A); and
$\beta$ is the number of mobile hydrogen functions per molecule of polyol (B).

Examples of alkylene oxides useful in the present invention include ethylene oxide, 1,2-propylene oxide, 1,2-butylene oxide, 2,3-butylene oxide, epichlorohydrin, styrene oxide, tetrahydrofuran, and their derivatives.

Representative polyfunctional alcohols useful in the present invention are, for example, ethylene glycol, 1,2-propylene glycol, 1,3-butylene glycol, 1-4-butylene glycol, 1-5-pentanediol, 1,4-pentanediol, 1,3-pentanediol, 1-6-hexanediol, 1,7-heptanediol, glycerine, trimethylolpropane, 1,3,6-hexanetriol, pentaerythritol, sorbitol, α-methyl-d-glucose, and their derivatives.

Examples of polycarboxylic acids useful in the present invention include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethylglutaric acid,α,β-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1-4-cyclohexanedicarboxylic acid, 3,4,9,10-perylenetetracarboxylic acid, and also anhydrides or lower alcohol esters of such acids.

In the present invention, representative amines can include, for example, methylamine, ethylamine, propylamine, methylethanolamine, methyldiethanolamine, methylpropanolamine, methyldipropanolamine, ethylethanolamine, ethylpropanolamine, diethanolamine, triethanolamine, methylisopropanolamine, triisopropanolamine, diisopropanolamine, dimethylaminopropylamine, ethylenediamine, hydrazine, toluenediamine, tetramethylenediamine, hexamethylenediamine, N,N'-dimethylhydrazine, 1,3-propylenediamine, 4,4-diaminodiphenylmethane, p-phenylenediamine, 1,4-butanediamine, diethylenetriamine and triethylenetetramine.

Representative organic polyisocyanates include any polyisocyanate having an organic radical that is aliphatic, aromatic, acyclic, alicyclic or heterocyclic. For example, suitable organic polyisocyanates include ethylene diisocyanate, ethylidene diisocyanate, 1-2-propylene diisocyanate, 1,2-cyclohexylene diisocyanate, 2-6-tolylene diisocyanate, 4,4'-diphenylmethane diisocyanate, 3,3'-di-methoxy-4,4'-diphenylene diisocyanate, p,p',p''-triphenylmethane diisocyanate, 1,5-naphthalene diisocyanate, furfurylidene diisocyanate, polyphenylpolymethylene polyisocyanates and polyisocyanates containing carbodiimide, urethane, allophanate, isocyanate or ureido groups.

A process for manufacturing the polyisocyanate prepolymers according to the present invention comprises the steps of reacting, at a temperature of between 10° and 150° C., and more preferably between 20° and 60° C., the mixture of at least one organic polyisocyanate, at least one condensation product (A), and at least one polyol (B). The relative amounts of the polyisocyanate, the condensation product (A), and the polyol (B) are provided by relationships (a)-(d), as noted above. If appropriate, the reaction may be carried out in the presence of a catalyst, such as, for example, triethylenediamine or metallic salts.

With the polyisocyanate prepolymers of the present invention, it is possible to prepare polyurethane foams or elastomers by employing formulae and operating procedures that are well known to the person of ordinary skill in the art. Such formulae and procedures are similar to those which are described, for example, in the following materials:

(a) Flexible Polyurethane Foams by G. Woods—1982—Appl. Sciences Publishers;
(b) Kunststoff Handbuch by VIEWEG-HOCHTLEN—Polyurethan, Vol. 7; and
(c) Advances in Urethane Science and Technology by FRISCH and REEGEN—Vols. 1 to 8.

The following examples illustrate the invention but are not to be construed as limiting the invention. The definitions of compounds (A) and (B) in the examples are given in Table I. The polyisocyanates identified in the examples are a mixture of the 2,4- and 2,6-isomers of toluene diisocyanate in the ratio 80:20 (TDI) or of the substantially pure 4,4'-diphenylmethane diisocyanate (MDI).

The mixture of the compounds is prepared by means of a typhoon-type stirrer having a diameter of 55 mm and running at a speed of $1 \times 10^{+2}$ revolutions/minute, in vessels of 2 to 5 liters. The viscosity of the product obtained is measured on a BROOKFIELD type LV viscometer. The number of the spindle employed is indicated in each example.

EXAMPLE 1

1000 g of compound 1(B) followed by 141.4 g of compound 1(A) are introduced into a 3 liter metal vessel, at ambient temperature. The mixture is stirred for 3 minutes. 35.2 g of TDI are then poured into the vessel over the course of 30 seconds. This mixture is stirred for 10 minutes, after which 0.1 g of stannous octoate (Kosmos 29) is added and stirring is continued for 10 minutes. At this stage, the temperature is found to be 35° C.

A transparent product, having a viscosity of 2850 centipoises at 25° C. (spindle 3) is obtained.

TABLE I

|  | Compound (A) | | | | Compound (B) | | | |
|---|---|---|---|---|---|---|---|---|
|  | 1 | 2 | 3 | 4 | 1 | 2 | 3 | 4 |
| Starter compound | TEDA | EDA | OTD | EDA | SOR | GLY | TMP | PE |
| % by weight of propylene oxide | 100 | 100 | 56 | 100 | 100 | 78 | 100 | 86 |
| % by weight of ethylene oxide | 0 | 0 | 44 | 0 | 0 | 22 | 0 | 14 |
| Molecular weight | 350 | 470 | 750 | 290 | 1350 | 4000 | 3000 | 5300 |
| %, in numbers, of primary —OH groups | 0 | 0 | >10 | 0 | 0 | 0 | 0 | 0 |

TEDA: Triethanolamine
EDA: Ethylenediamine
OTD: Crude ortho-toluenediamine
SOR: Sorbitol
GLY: Glycerol
TMP: Trimethylolpropane
PE: Pentaerythritol

EXAMPLE 2 (COMPARATIVE EXAMPLE)

Using the conditions of Example 1, 60.2 g of triethanolamine, followed by 35.2 g of TDI, followed by 0.1 g of stannous octoate are added to 1000 g of compound 1(B). After stirring, the temperature is found to be 38° C. A white product showing small suspended specks is obtained.

EXAMPLE 3

400 g of compound 2(B) followed by 282 g of compound 2(A) are introduced into a 3 liter metal vessel at ambient temperature. The contents are stirred to mix completely the two products.

400 g of compound 2(B), followed by 34.8 g of TDI, are introduced, at ambient temperature, into a second vessel. This mixture is stirred for 1 minute after which the whole mixture is added to the mixture in the first vessel, over the course of 1 minute, with stirring. The batch is stirred for 10 minutes and the temperature is found to be 32° C. A transparent product is obtained. 1 g of stannous octoate is then added to the product. An opalescent product having a viscosity of 1815 centipoises (spindle 2) at 25° C. is obtained.

EXAMPLE 4 (COMPARATIVE EXAMPLE)

800 g of compound 2(B), 86 g of ethylenediamine and 34.8 g of TDI are mixed under the conditions of Example 3. After stirring, the temperature is found to be 45° C. The product obtained is white and exhibits specks.

EXAMPLE 5

1200 g of compound 3(B) followed by 150 g of compound 3(A) are introduced into a 3 liter metal vessel at ambient temperature. The mixture is stirred for 3 minutes and is then heated to 52° C. Thereafter, 69.6 g of TDI are added, with stirring, and the batch is stirred for 10 minutes. The temperature is found to be 55° C. Finally, 1 g of stannous octoate is added and the batch is stirred for 2 minutes. An opaque yellow product is obtained. Its viscosity at 25° C. is 4800 centipoises (spindle 3).

EXAMPLE 6

954 g of compound 4(B), followed by 2.9 g of compound 4(A) are introduced, at ambient temperature, into a 3 liter metal vessel. The mixture is stirred for 3 minutes and 3.8 g of MDI (Isonate L143) are then added over the course of 30 seconds. The batch is stirred for 10 minutes. No significant increase in temperature is observed. The product obtained is opalescent. Its viscosity at 25° C. is 662 centipoises (spindle 2).

EXAMPLE 7

1060 g of compound 4(B) followed by 7.3 g of compound 4(A) are introduced, at ambient temperature, into a 3 liter metal vessel. After mixing these compounds, 6.25 g of MDI are added. The batch is stirred for 2 minutes. 1 g of stannous octoate is then added. The batch is again stirred, for 10 minutes. A white product having a viscosity of 795 centipoises (spindle 2) at 25° C. is obtained.

EXAMPLE 8

The following are mixed, at ambient temperature, in a 1.5 liter plastic bottle:
196 g of compound 2(B)
14 g of the product of Example 1
9.6 g of water
0.58 g of dimethylethanolamine (DMEA)
2.8 g of silicone oil (Tegostab BF 2370).
0.3 g of stannous octoate is then added, followed by 116.6 g of TDI. The entire contents are mixed vigorously for 10 seconds and the liquid is poured into a paper cube of 20 cm edge length. The rise time, which is the interval of time between the instant at which the TDI is added and that at which the rise of the ceases, is found to be 135 seconds. A porous foam of density 22 kg/m³ is obtained, the high hardness of which, measured in accordance with Standard Specification NFT 56110, has the following values:

| | | |
|---|---|---|
| CLD (compression load deflection) at 25% | 2.6 KPa |
| | 50% | 3.9 KPa |
| | 65% | 6.4 KPa |

EXAMPLES 9 to 11

The procedure of Example 8 is followed. The weight, in grams, of the products used, as well as the characteristics of the foams obtained, are shown in Table II below.

TABLE II

| EXAMPLES | 9 | 10 | 11 |
|---|---|---|---|
| Compound 2(B) | 180 | | |
| Product of Example 3 | 20 | | |
| Product of Example 6 | | 200 | |
| Product of Example 7 | | | 200 |
| Water | 9.6 | 9.6 | 9.6 |
| DMEA | 0.58 | 0.58 | 0.58 |
| Silicone oil | 2.8 | 2.8 | 2.8 |
| Stannous octoate | 0.3 | 0.3 | 0.3 |
| TDI | 115 | 113.5 | 113.3 |
| Rise time (in seconds) | 102 | 94 | 94 |
| Density (kg/m³) | 22 | 22 | 23 |
| CLD (in KPa) at 25% | 2.5 | 2.7 | 2.8 |
| 50% | 3.4 | 3.6 | 3.8 |
| 65% | 5.4 | 5.8 | 6.5 |

Examples 10 and 11 show the influence of increasing the ratios $$\frac{a}{a+b+n} \text{ and } \frac{b}{a+b+n}$$

on the rise time of the foam.

EXAMPLES 12 to 15

These examples show the increase in rise time of the foam. The procedure followed is as in Example 8. The weights of the products used are as shown in Table III below.

Examples 12, 13 and 14 are given by way of comparison.

TABLE III

| EXAMPLES | 12 | 13 | 14 | 15 |
|---|---|---|---|---|
| Compound 2(B) | 200 | | 100 | 100 |
| Compound 3(B) | | 200 | 100 | |
| Product of Example 5 | | | | 100 |
| Water | 9.6 | 9.6 | 9.6 | 9.6 |
| DMEA | 0.58 | 0.58 | 0.58 | 0.58 |
| Silicone oil* | 2.8 | 2.8 | 2.8 | 2.6 |
| Stannous octoate* | 0.3 | 0.40 | 0.40 | 0.30 |
| TDI** | 112 | 119 | 115.7 | 114 |
| Rise time (in seconds) | 145 | 120 | 110 | 125 |
| Density (kg/m³) | 22 | 23 | 23 | 22 |
| CLD (in KPa) at 25% | 2.2 | 2.1 | 2.1 | 2.6 |
| 50% | 3.0 | 3.0 | 2.9 | 3.5 |
| 65% | 4.7 | 4.6 | 4.5 | 6.5 |

*The amount is adjusted to make it possible to obtain a foam without shrinkage.
**The amount is adjusted so as always to have the same ratio $\frac{\text{sum of NCO groups}}{\text{sum of OH groups}} = 1.06.$

What is claimed is:

1. A stable polyisocyanate prepolymer containing hydroxy groups comprising a product of the polyaddition of at least one organic polyisocyanate with at least one condensation product (A) of an alkylene oxide with an amine, in the presence of at least one polyol (B) containing free hydroxy functions, the polyol (B) containing no primary hydroxy functions and having a molecular weight of at least 1,300, the condensation product (A) and the polyol (B) being present in an amount effective to yield a stable polyisocyanate prepolymer containing hydroxy groups.

2. The prepolymer of claim 1, wherein said polyol (B) is a polyether or a polythioether having a molecular weight of between about 1,300 and about 10,000, said polyol (B) being obtained by the reaction of at least one alkylene oxide with (i) a polyfunctional alcohol, (ii) a thiodiglycol, or (iii) a polyfunctional alcohol and a thiodiglycol.

3. The prepolymer of claim 2, wherein the polyether or the polythioether is obtained from a mixture of alkylene oxides comprising at most 30% by weight of ethylene oxide.

4. The prepolymer of claim 3, wherein the polyether or the polythioether contains from 2 to 6 hydroxy functions per molecule.

5. The prepolymer of claim 2, wherein the polyether or the polythioether contains from 2 to 6 hydroxy functions per molecule.

6. The prepolymer of claim 1, wherein said polyol (B) is a grafted polyol.

7. The prepolymer of claim 1, wherein the polyol (B) containing no primary hydroxy functions is a high molecular weight polyester.

8. The prepolymer of claim 1 wherein said polyisocyanate is selected from the group consisting of (1) an 80:20 ratio of 2,4 toluene diisocyanate and 2,6 toluene diisocyanate and (2) 4,4'-diphenylmethane diisocyanate, wherein said alkylene oxide is selected from the group consisting of ethylene oxide and propylene oxide, wherein said amine is selected from the group consisting of triethonolamine, ethylenediamine, and ortho-toluenediamine, and wherein said polyol (B) is selected from the group consisting of sorbitol, glycerol, trimethylpropane and pentaerythritol.

9. A process for manufacturing the prepolymer of claim 1 comprising the step of reacting at a temperature of between about 10° and about 150° C. the mixture of at least one organic polyisocyanate, at least one condensation product (A), and at least one polyol (B), wherein the condensation product (A) and the polyol (B) are as defined in claim 1.

10. The process of claim 9, wherein said reaction temperature is between about 20° and about 60° C.

11. The prepolymer of claim 1, wherein the organic polyisocyanate, the condensation product (A) and the polyol (B) are present in an amount to satisfy the following formulae:

(a)
$$\frac{nN}{a\alpha + b\beta}$$

of between about 0.01 and about 0.60;

(b)
$$\frac{n}{n + a + b}$$

of between about 0.025 and about 0.5;

(c)
$$\frac{b}{n + a + b}$$

of between about 0.20 and about 0.95;

(d)
$$\frac{a}{n + a + b}$$

of between about 0.025 and about 0.70;
wherein in formulae a–d, n, N, a, b, $\alpha$, and $\beta$ are defined:
  n is the number of polyisocyanate molecules;
  N is the number of NCO functions per molecule;
  a is the number of molecules of the condensation product (A);
  b is the number of polyol (B) molecules;
  $\alpha$ is the number of mobile hydrogen functions per molecule of condensation product (A); and
  $\beta$ is the number of mobile hydrogen functions per molecule of polyol (B).

12. The prepolymer of claim 11, wherein the ratio of formula (c) is between about 0.2 and about 0.8 and the ratio of formula (d) is between about 0.10 and about 0.60.

* * * * *